(12) United States Patent
Wu

(10) Patent No.: US 11,281,378 B2
(45) Date of Patent: Mar. 22, 2022

(54) METHOD OF INCREASING OPERATIONAL LIFE TIME OF SSD RAID AND STORAGE EQUIPMENT USING SAME

(71) Applicant: QNAP SYSTEMS, INC., New Taipei (TW)

(72) Inventor: Tsu-Yu Wu, New Taipei (TW)

(73) Assignee: QNAP SYSTEMS, INC., New Taipei (TW)

( * ) Notice: Subject to any disclaimer, the term of this patent is extended or adjusted under 35 U.S.C. 154(b) by 58 days.

(21) Appl. No.: 16/896,851

(22) Filed: Jun. 9, 2020

(65) Prior Publication Data

US 2021/0342072 A1 Nov. 4, 2021

(30) Foreign Application Priority Data

Apr. 29, 2020 (TW) .................................. 109114378

(51) Int. Cl.
*G06F 3/06* (2006.01)
*G06F 11/10* (2006.01)

(52) U.S. Cl.
CPC .......... *G06F 3/0616* (2013.01); *G06F 3/0644* (2013.01); *G06F 3/0659* (2013.01); *G06F 3/0689* (2013.01); *G06F 11/1076* (2013.01); *G06F 2211/1021* (2013.01)

(58) Field of Classification Search
CPC .......... G06F 3/616; G06F 3/689; G06F 3/659; G06F 3/0644; G06F 2211/1021; G06F 11/1076
See application file for complete search history.

(56) References Cited

U.S. PATENT DOCUMENTS

2005/0223156 A1* 10/2005 Lubbers ................ G06F 3/0619
711/100
2021/0011659 A1* 1/2021 Koseki ................ G06F 11/1076

FOREIGN PATENT DOCUMENTS

TW I665550 7/2019

* cited by examiner

*Primary Examiner* — Kalpit Parikh
(74) *Attorney, Agent, or Firm* — Guice Patents PLLC

(57) ABSTRACT

A method of increasing operational life time of SSD RAID and a storage equipment using same, the method including: configuring a data storage device to have a plurality of storage areas, each storage area including a plurality of stripes, and each stripe including an individual block of a plurality of solid state disks, where at least one block in each stripe is a check bit block, the other blocks are data blocks; and configuring two neighboring stripes in each storage area to form a composite stripe according to a plurality of index combinations in a mapping table, where the composite stripe includes two neighboring blocks in each solid state disk, and the composite stripe is divided into a stripe writing area and an empty stripe area, so that each solid state disk in each storage area has a reserved space.

8 Claims, 4 Drawing Sheets

STEP a — CONFIGURING THE DATA STORAGE DEVICE TO HAVE A PLURALITY OF STORAGE AREAS, EACH OF THE STORAGE AREAS INCLUDING A PLURALITY OF STRIPES, EACH OF THE STRIPES INCLUDING AN INDIVIDUAL BLOCK OF EACH OF THE SOLID STATE DISKS, WHERE AT LEAST ONE OF THE BLOCKS IN EACH OF THE STRIPES IS A CHECK BIT BLOCK, THE OTHER OF THE BLOCKS ARE DATA BLOCKS, AND THE CHECK BIT BLOCK IS USED TO STORE CHECK BIT DATA OF THE DATA BLOCKS

STEP b — CONFIGURING TWO NEIGHBORING ONES OF THE STRIPES IN EACH OF THE STORAGE AREAS TO FORM A COMPOSITE STRIPE ACCORDING TO A PLURALITY OF INDEX COMBINATIONS IN A MAPPING TABLE, WHERE THE COMPOSITE STRIPE INCLUDES TWO NEIGHBORING ONES OF THE BLOCKS IN EACH OF THE SOLID STATE DISKS, AND THE COMPOSITE STRIPE IS DIVIDED INTO A STRIPE WRITING AREA AND AN EMPTY STRIPE AREA, THE STRIPE WRITING AREA INCLUDING AT LEAST ONE CHECK BIT SUB-AREA, A PLURALITY OF DATA SUB-AREAS, AND A RESERVED SUB-AREA, WHERE A TOTAL STORAGE CAPACITY OF THE PLURALITY OF DATA SUB-AREAS IS EQUAL TO A TOTAL STORAGE CAPACITY OF THE PLURALITY OF DATA BLOCKS IN EACH OF THE STRIPES, AND THE EMPTY STRIPE AREA INCLUDES AT LEAST ONE FIRST EMPTY AREA, A PLURALITY OF SECOND EMPTY AREAS AND A THIRD EMPTY AREA CORRESPONDING TO THE AT LEAST ONE CHECK BIT SUB-AREA, THE PLURALITY OF DATA SUB-AREAS AND THE RESERVED SUB-AREA RESPECTIVELY, SO THAT EACH OF THE SOLID STATE DISKS IN EACH OF THE STORAGE AREAS HAS A RESERVED SPACE

STEP c — EXECUTING A RAID EMERGENCY CHECKING PROCEDURE TO CHECK WHETHER A PREDETERMINED NUMBER OF THE SOLID-STATE DISKS HAVE FAILED TO WORK NORMALLY

STEP d — WHEN THE RAID EMERGENCY CHECKING PROCEDURE HAS AN EXECUTION RESULT OF FALSE, THE DATA STORAGE DEVICE WILL FIND TWO TARGET DISKS OF THE SOLID-STATE DISKS THAT HAVE CLOSEST REMAINING WRITE TIMES AMONG ANY TWO OF THE SOLID-STATE DISKS AND SELECT ONE OF THE TWO TARGET DISKS FOR SETTING THE RESERVED SUB-AREA AND THE THIRD EMPTY AREA, AND WHEN THE RAID EMERGENCY CHECKING PROCEDURE HAS AN EXECUTION RESULT OF TRUE, THE DATA STORAGE DEVICE WILL FIND A TARGET DISK OF THE SOLID STATE DISKS THAT HAS THE LEAST NUMBER OF REMAINING WRITE TIMES AMONG THE SOLID STATE HARD DISKS AND SET THE RESERVED SUB-AREA AND THE THIRD EMPTY AREA ON THE TARGET DISK

FIG. 1

| | |
|---|---|
| 1st WRITE | REGION-1 OP_DISK=1 |
| 2nd WRITE | REGION-1 OP_DISK=2 |
| 3rd WRITE | REGION-1 OP_DISK=2 |
| 4th WRITE | REGION-1 OP_DISK=3 |
| 5th WRITE | REGION-1 OP_DISK=3 |
| 6th WRITE | REGION-1 OP_DISK=3 |
| 7th WRITE | REGION-1 OP_DISK=4 |
| 8th WRITE | REGION-1 OP_DISK=4 |
| 9th WRITE | REGION-1 OP_DISK=4 |
| 10th WRITE | REGION-1 OP_DISK=4 |

FIG. 3

METHOD OF INCREASING OPERATIONAL LIFE TIME OF SSD RAID AND STORAGE EQUIPMENT USING SAME

BACKGROUND OF THE INVENTION

Field of the Invention

The present invention relates to a solid-state disk array, in particular to a method capable of avoiding simultaneous failure of multiple SSDs (solid-state disks) in a RAID (redundant array of independent disks) to increase the operational life of the RAID.

Description of the Related Art

The number of write times of a general SSD has an upper limit. To avoid a single block from being worn out, a storage device having an SSD RAID will generally access each block of each solid-state disk evenly. However, this approach still can cause multiple SSDs in the SSD RAID to be worn out at same time in a short period, causing the SSD RAID unable to continue operation.

To solve the above problems, some algorithms have been proposed in the prior art. For example, the Taiwan patent TWI665550 proposes a data distribution method for a disk array to prevent multiple flash storage devices in the disk array from being simultaneously worn out in a short time. The method includes: dividing the multiple flash storage devices of the disk array into multiple data configuration areas with a same data distribution pattern, where each data configuration area includes a first partition and a second partition, each first partition includes a plurality of first stripes and a plurality of first stripe units, and each second partition includes a plurality of second stripes and a plurality of second stripe units; and using a first rotation mode to distribute the first stripe units evenly in the first stripes over all the flash storage devices, and using a second rotation mode to distribute the second stripe units evenly in the second stripes over all the flash storage devices.

However, as the above algorithm uses a fixed pattern to configure the reserved areas, it cannot adaptively respond to various scenarios of the solid-state disk array (for example, the solid-state disk array is composed of new and old solid-state disks) to select proper solid-state disks to set the reserved spaces to extend the operational life of the solid-state disk array.

Therefore, there is a need in the art for a method that can adaptively set reserved spaces in an SSD RAID to increase the operating life of the SSD RAID.

SUMMARY OF THE INVENTION

One objective of the present invention is to propose a method of increasing operational life time of SSD RAID, which can use a mapping table to adaptively change the content thereof to configure two neighboring stripes in each storage area of a data storage device to form a composite stripe, where the composite stripe includes two blocks of each solid state disk in the data storage device, and the composite stripe is divided into a stripe writing area and an empty stripe area, so that each of the solid state disks in each of the storage areas has a reserved space.

Another objective of the present invention is to provide a method of increasing operational life time of SSD RAID, which can use a RAID emergency checking procedure to check whether a predetermined number of the solid-state disks have failed to work normally, if not, the data storage device will find two target disks of the solid-state disks that have closest remaining write times among any two of the solid-state disks and select one of the two target disks for setting the reserved sub-area and the third empty area, and if so, the data storage device will find a target disk of the solid state disks that has the least number of remaining write times among the solid state hard disks and set reserved sub-areas on the target disk, thereby adaptively extend the operational life of the SSD RAID.

To achieve the objectives mentioned above, a method of increasing operational life time of SSD RAID is proposed, the method being implemented by a software program executed by a control unit in a data storage device having a plurality of solid-state disks, and the method includes:

configuring the data storage device to have a plurality of storage areas, each of the storage areas including a plurality of stripes, each of the stripes including an individual block of each of the solid state disks, where at least one of the blocks in each of the stripes is a check bit block, the other of the blocks are data blocks, and the check bit block is used to store check bit data of the data blocks; and configuring two neighboring ones of the stripes in each of the storage areas to form a composite stripe according to a plurality of index combinations in a mapping table, where the composite stripe includes two neighboring ones of the blocks in each of the solid state disks, and the composite stripe is divided into a stripe writing area and an empty stripe area, the stripe writing area including at least one check bit sub-area, a plurality of data sub-areas, and a reserved sub-area, where a total storage capacity of the plurality of data sub-areas is equal to a total storage capacity of the plurality of data blocks in each of the stripes, and the empty stripe area includes at least one first empty area, a plurality of second empty areas and a third empty area corresponding to the at least one check bit sub-area, the plurality of data sub-areas and the reserved sub-area respectively, so that each of the solid state disks in each of the storage areas has a reserved space.

In one embodiment, the data storage device supports a full stripe write operation, and the full stripe write operation is executed to write data to be written and corresponding check bit data of the data to be written into one stripe or one composite stripe when a total amount of the data to be written is equal to a storage capacity of all the data blocks of one stripe.

In one embodiment, a first data sub-area of the plurality of data sub-areas of the stripe writing area has a first storage capacity, each of a plurality of second data sub-areas of the plurality of data sub-areas of the stripe writing area has a second storage capacity, the first storage capacity is greater than the second storage capacity, and the check bit sub-area of the stripe writing area has the first storage capacity.

In one embodiment, a first empty sub-area of the plurality of second empty areas of the empty stripe that is corresponding to the first data sub-area has a third storage capacity, a plurality of second empty sub-areas of the plurality of second empty areas of the empty stripe that are corresponding to the plurality of second data sub-areas each have a fourth storage capacity, the fourth storage capacity is greater than the third storage capacity, the first empty area has the third storage capacity, the first storage capacity plus the third storage capacity is equal to a total storage capacity of two blocks, the second storage capacity plus the fourth storage capacity is equal to the total storage capacity of two blocks, and a total storage capacity of the reserved sub-area and the third empty area is equal to the total storage capacity of two blocks.

In one embodiment, each of the index combinations includes a flag, an address, and a disk index to generate one composite stripe in one storage area, wherein the flag is used to indicate whether to generate one composite stripe, the address is used to point to one stripe of the plurality of the stripes in one storage area, and the disk index is used to select one solid-state disk of the plurality of solid-state disks for setting the reserved sub-area and the third empty area.

In one embodiment, a plurality of the index combinations of the mapping table form a fixed configuration or a time-varying configuration.

In one embodiment, when the plurality of the index combinations of the mapping table form the fixed configuration, each solid-state disk has a sum of the reserved spaces each disposed in one of the plurality of storage areas that accounts for a fixed proportion of a total storage space thereof.

In one embodiment, the method of improving the operational life of a solid-state disk array further includes: executing a RAID emergency checking procedure to check whether a predetermined number of the solid-state disks have failed to work normally.

In one embodiment, when the RAID emergency checking procedure has an execution result of false, the data storage device will find two target disks of the solid-state disks that have closest remaining write times among any two of the solid-state disks and select one of the two target disks for setting the reserved sub-area and the third empty area, and when the RAID emergency checking procedure has an execution result of true, the data storage device will find a target disk of the solid state disks that has the least number of remaining write times among the solid state hard disks and set the reserved sub-area and the third empty area on the target disk.

To achieve the objectives, the present invention further proposes a storage device having the control unit and the plurality of solid state disks mentioned above.

BRIEF DESCRIPTION OF THE DRAWINGS

FIG. 1 illustrates a flowchart of an embodiment of a method of increasing operational life time of SSD RAID of the present invention.

FIG. 3 illustrates a schematic diagram of the method of the present invention to change the content of the disk index OP_DISK in 10 write operations to set the ratio of the reserved spaces between the four solid state disks in the first storage area.

DETAILED DESCRIPTION OF THE PREFERRED EMBODIMENTS

Figure 2:
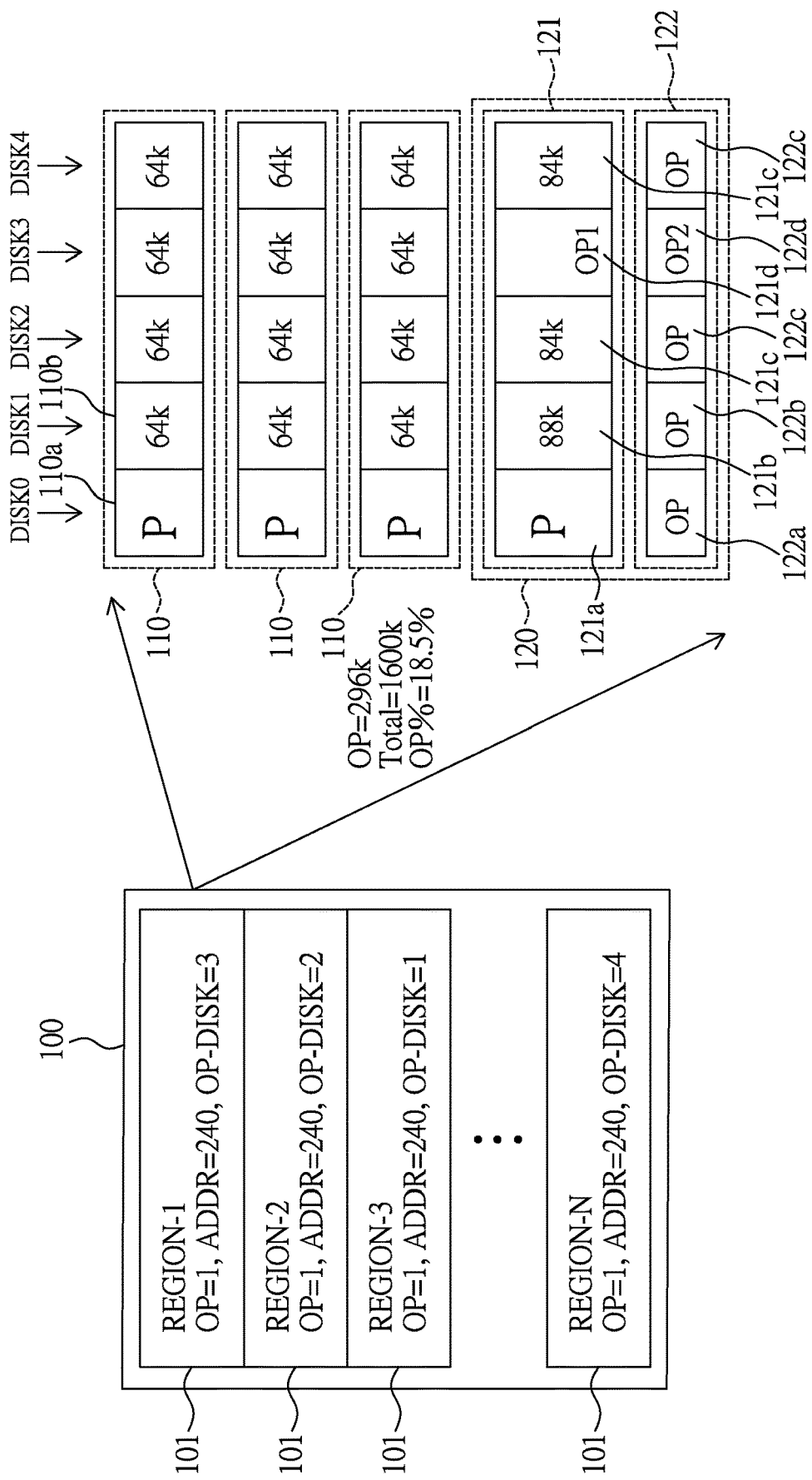
FIG. 2 illustrates an application example of the method of FIG. 1 for increasing the operational life of a solid-state disk array.

To make it easier for our examiner to understand the objective of the invention, its structure, innovative features, and performance, we use preferred embodiments together with the accompanying drawings for the detailed description of the invention.

The principle of the method of increasing operational life time of SSD RAID of the present invention lies in:

1. Configuring a data storage device to have a plurality of storage areas, each of the storage areas including a plurality of stripes, each of the stripes including an individual block of each of the solid state disks, where at least one of the blocks in each of the stripes is a check bit block, the other of the blocks are data blocks, and the check bit block is used to store check bit data of the data blocks;

2. Using a mapping table capable of adaptively changing the content thereof to configure two neighboring stripes in each storage area to form a composite stripe, where the composite stripe includes two blocks of each solid state disk in the data storage device, and the composite stripe is divided into a stripe writing area and an empty stripe area, so that each of the solid state disks in each of the storage areas has a reserved space; and 3. Using a RAID emergency checking procedure to check whether a predetermined number of the solid-state disks have failed to work normally, if not, find two target disks of the solid-state disks that have closest remaining write times among any two of the solid-state disks and select one of the two target disks for setting the reserved sub-area and the third empty area, and if so, find a target disk of the solid state disks that has the least number of remaining write times among the solid state hard disks and set reserved sub-areas on the target disk.

Please refer to FIG. 1, which illustrates a flowchart of an embodiment of the method of increasing operational life time of SSD RAID of the present invention, which is implemented by a software program executed by a control unit in a data storage device, and the data storage device has a plurality of solid state disks. As illustrated in FIG. 1, the method of increasing operational life time of SSD RAID includes: configuring the data storage device to have a plurality of storage areas, each of the storage areas including a plurality of stripes, each of the stripes including an individual block of each of the solid state disks, where at least one of the blocks in each of the stripes is a check bit block, the other of the blocks are data blocks, and the check bit block is used to store check bit data of the data blocks (step a); configuring two neighboring ones of the stripes in each of the storage areas to form a composite stripe according to a plurality of index combinations in a mapping table, where the composite stripe includes two neighboring ones of the blocks in each of the solid state disks, and the composite stripe is divided into a stripe writing area and an empty stripe area, the stripe writing area including at least one check bit sub-area, a plurality of data sub-areas, and a reserved sub-area, where a total storage capacity of the plurality of data sub-areas is equal to a total storage capacity of the plurality of data blocks in each of the stripes, and the empty stripe area includes at least one first empty area, a plurality of second empty areas and a third empty area corresponding to the at least one check bit sub-area, the plurality of data sub-areas and the reserved sub-area respectively, so that each of the solid state disks in each of the storage areas has a reserved space (step b); executing a RAID emergency checking procedure to check whether a predetermined number of the solid-state disks have failed to work normally (step c); and when the RAID emergency checking procedure has an execution result of false, the data storage device will find two target disks of the solid-state disks that have closest remaining write times among any two of the solid-state disks and select one of the two target disks for setting the reserved sub-area and the third empty area, and when the RAID emergency checking procedure has an execution result of true, the data storage device will find a target disk of the solid state disks that has the least number of remaining write times among the solid state hard disks and set the reserved sub-area and the third empty area on the target disk (step d).

According to the setting of step a, the data storage device can support a full stripe write operation, and the full stripe write operation is executed to write data to be written and corresponding check bit data of the data to be written into one stripe or one composite stripe when a total amount of the data to be written is equal to a storage capacity of all the data blocks of one stripe.

In addition, preferably, in step b, a first data sub-area of the plurality of data sub-areas of the stripe writing area has a first storage capacity, each of a plurality of second data sub-areas of the plurality of data sub-areas of the stripe writing area has a second storage capacity, the first storage capacity is greater than the second storage capacity, and the check bit sub-area of the stripe writing area has the first storage capacity.

In addition, preferably, in step b, a first empty sub-area of the plurality of second empty areas of the empty stripe that is corresponding to the first data sub-area has a third storage capacity, a plurality of second empty sub-areas of the plurality of second empty areas of the empty stripe that are corresponding to the plurality of second data sub-areas each have a fourth storage capacity, the fourth storage capacity is greater than the third storage capacity, the first empty area has the third storage capacity, the first storage capacity plus the third storage capacity is equal to a total storage capacity of two blocks, the second storage capacity plus the fourth storage capacity is equal to the total storage capacity of two blocks, and a total storage capacity of the reserved sub-area and the third empty area is equal to the total storage capacity of two blocks.

In addition, preferably, in step b, each of the index combinations includes a flag, an address, and a disk index to generate one composite stripe in one storage area, wherein the flag is used to indicate whether to generate one composite stripe, the address is used to point to one stripe of the plurality of the stripes in one storage area, and the disk index is used to select one solid-state disk of the plurality of solid-state disks for setting the reserved sub-area and the third empty area.

In addition, preferably, in step b, a plurality of the index combinations of the mapping table may form a fixed configuration or a time-varying configuration.

In addition, in step b, when the plurality of the index combinations of the mapping table form the fixed configuration, each solid-state disk has a sum of the reserved spaces each disposed in one of the plurality of storage areas that accounts for a fixed proportion of a total storage space thereof.

In addition, in step d, the data storage device may execute a remaining write times recording procedure to record the remaining write times for each of the solid-state disks.

Please refer to FIG. 2, which illustrates an application example of the method of FIG. 1 for increasing the operational life of a solid-state disk array. As illustrated in FIG. 2, the method of the present invention uses a mapping table 100 to configure the distribution of reserved areas of an SSD RAID having five solid state disks (DISK0, DISK1, DISK2, DISK3, and DISK4), where the mapping table 100 stores N index combinations 101, each index combination 101 including a flag OP, a bit address ADDR and a disk index OP_DISK; the solid-state disk array supports full stripe write operation and is divided into a plurality of storage areas, each of the storage areas includes a plurality of stripes 110, each of the stripes 110 includes a block (64k bytes) of each solid state disk, and the block of one solid state disk is a check bit block 110a, the blocks of the other solid state disks are data blocks 110b, and the check bit block 110a is used to store the check bit data resulted from the data blocks 110b.

In the index combination 101 in the first area, the flag OP=1, the address ADDR=240, and the disk index OP_DISK=3, where OP=1 means to set a composite stripe in the storage area corresponding to the index combination 101; the address ADDR=240 points to the 4th stripe in the storage area corresponding to the index combination 101, which means that the 4th and 5th stripes in the storage area corresponding to the index combination 101 are selected to form a composite stripe 120 (since each block has 64k bytes, each stripe 110 has 5 blocks, and each increment of 1 in the address ADDR will point to the next 4k bytes memory unit, therefore, the address ADDR=240 will point to the 240th 4k bytes memory unit, that is, the address ADDR=0 will point to the first stripe 110, and the address ADDR=240 will point to the fourth stripe); and the disk index OP_DISK=3 points to the 4th solid state disk in the storage area corresponding to the index combination 101, which means that the blocks belonging to the 4th solid state disk and located in the 4th and 5th stripes in the storage area corresponding to the index combination 101 are to be set as reserved areas.

The composite stripe 120 is formed by two neighboring stripes 110 and includes two blocks of each solid state disk, and the composite stripe 120 is divided into a stripe writing area 121 and an empty stripe area 122.

The stripe writing area 121 includes a check bit sub-area 121a (having 88k bytes), a plurality of data sub-areas (including: a first data sub-area 121b having 88k bytes; and two second data sub-area 121c each having 84k bytes) and a reserved sub-area 121d, where the total storage capacity of the data sub-areas (88k+84k+84k=256k) is equal to the total storage capacity of the data blocks (64k*4=256k) of one stripe.

The empty stripe area 122 includes a first empty area 122a, a plurality of second empty areas (including a first empty sub-area 122b having 40k bytes and two second empty sub-areas 122c each having 44k bytes) and a third empty area 122d corresponding to the check bit sub-area 121a, the plurality of data sub-areas (a first data sub-area 121b and two second data sub-areas 121c) and the reserved sub-area 121d respectively, where the total storage capacity of the third empty area 122d and the reserved sub-area 121d is equal to 128k bytes. With this arrangement, the present invention can make each solid state disk in each storage area have a reserved space.

In addition, by changing the content of the disk index OP_DISK in multiple write operations, the present invention can set the reserved space ratio between each solid state disk in a storage area. Please refer to FIG. 3, which illustrates a schematic diagram of the method of the present invention to change the content of the disk index OP_DISK in 10 write operations to set the ratio of the reserved spaces between the four solid state disks in the first storage area to 1:2:3:4.

In addition, in practical operations, the present invention may further execute a RAID emergency checking procedure to check whether a predetermined number of the solid-state disks have run out of the reserved space or failed to work normally, and when the RAID emergency checking procedure has an execution result of "false", find two target disks of the solid-state disks that have closest remaining write times among any two of the solid-state disks and select one of the two target disks for setting the reserved sub-area 121d and the third empty area 122d; and when the RAID emergency checking procedure has an execution result of "true", find a target disk of the solid state disks that has the least number of remaining write times among the solid state hard disks and set the reserved sub-area 121*d* and the third empty area 122*d* on the target disk. Besides, a remaining write times recording program can be used to record the remaining write times of each solid state disk.

Figure 4:
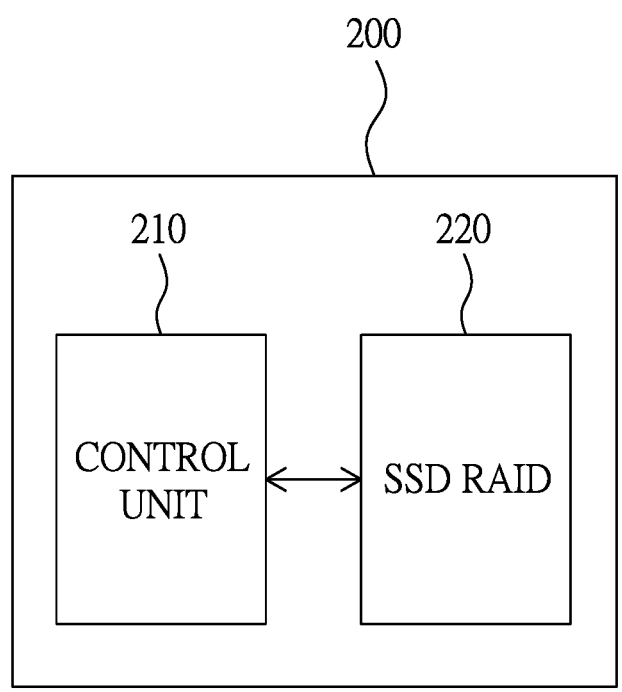
FIG. 4 illustrates a block diagram of an embodiment of the storage device of the present invention.

Based on the above description, the present invention further proposes a storage device. Please refer to FIG. 4, which illustrates a block diagram of an embodiment of the storage device of the present invention. As illustrated in FIG. 4, a storage device 200 has a control unit 210 and an SSD RAID 220 to implement the method of the present invention for increasing the operational life of the SSD RAID 220, wherein the control unit 210 is implemented by the control unit as disclosed in FIG. 1, and the SSD RAID 220 has a plurality of solid-state disks as disclosed in FIG. 1, where the SSD RAID 220 is configured to support the full stripe write operations and can adaptively change the reserved spaces in the SSD RAID 220 to effectively increase the operational life of the storage device.

It can be seen from the above description that the present invention has the following advantages:

(1) The method of increasing operational life time of SSD RAID of the present invention can use a mapping table to adaptively change the content thereof to configure two neighboring stripes in each storage area of a data storage device to form a composite stripe, where the composite stripe includes two blocks of each solid state disk in the data storage device, and the composite stripe is divided into a stripe writing area and an empty stripe area, so that each of the solid state disks in each of the storage areas has a variable reserved space.

(2) The method of increasing operational life time of SSD RAID of the present invention can use a RAID emergency checking procedure to check whether a predetermined number of the solid-state disks have failed to work normally, if not, the data storage device will find two target disks of the solid-state disks that have closest remaining write times among any two of the solid-state disks and select one of the two target disks for setting the reserved sub-area and the third empty area, and if so, the data storage device will find a target disk of the solid state disks that has the least number of remaining write times among the solid state hard disks and set reserved sub-areas on the target disk, thereby adaptively extend the operational life of the solid-state disk RAID.

(3) The storage device of the present invention can use a mapping table to adaptively change the content thereof to configure two neighboring stripes in each storage area of a data storage device to form a composite stripe, where the composite stripe includes two blocks of each solid state disk in the data storage device, and the composite stripe is divided into a stripe writing area and an empty stripe area, so that each of the solid state disks in each of the storage areas has a variable reserved space.

(4) The storage device of the present invention can use a RAID emergency checking procedure to check whether a predetermined number of the solid-state disks have failed to work normally, if not, the data storage device will find two target disks of the solid-state disks that have closest remaining write times among any two of the solid-state disks and select one of the two target disks for setting the reserved sub-area and the third empty area, and if so, the data storage device will find a target disk of the solid state disks that has the least number of remaining write times among the solid state hard disks and set reserved sub-areas on the target disk, thereby adaptively extend the operational life of the solid-state disk RAID.

While the invention has been described by way of example and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance over the conventional structure and further complies with the patent application requirements and is submitted to the Patent and Trademark Office for review and granting of the commensurate patent rights.

What is claimed is:

1. A method of increasing operational life time of SSD RAID, which is implemented by using a control unit in a data storage device to execute a software program, and the data storage device has a plurality of solid-state disks, the method including:

configuring the data storage device to have a plurality of storage areas, each of the storage areas including a plurality of stripes, each of the stripes including an individual block of each of the solid state disks, where at least one of the blocks in each of the stripes is a check bit block, the other of the blocks are data blocks, and the check bit block is used to store check bit data of the data blocks; and configuring two neighboring ones of the stripes in each of the storage areas to form a composite stripe according to a plurality of index combinations in a mapping table, where the composite stripe includes two neighboring ones of the blocks in each of the solid state disks, and the composite stripe is divided into a stripe writing area and an empty stripe area, the stripe writing area including at least one check bit sub-area, a plurality of data sub-areas, and a reserved sub-area, where a total storage capacity of the plurality of data sub-areas is equal to a total storage capacity of the plurality of data blocks in each of the stripes, and the empty stripe area includes at least one first empty area, a plurality of second empty areas and a third empty area corresponding to the at least one check bit sub-area, the plurality of data sub-areas and the reserved sub-area respectively, so that each of the solid state disks in each of the storage areas has a reserved space;

wherein a first data sub-area of the plurality of data sub-areas of the stripe writing area has a first storage capacity, each of a plurality of second data sub-areas of the plurality of data sub-areas of the stripe writing area has a second storage capacity, the first storage capacity is greater than the second storage capacity, and the check bit sub-area of the stripe writing area has the first storage capacity.

2. The method of increasing operational life time of SSD RAID of claim 1, wherein the data storage device supports a full stripe write operation, and the full stripe write operation is executed to write data to be written and corresponding check bit data of the data to be written into one said stripe or one said composite stripe when a total amount of the data to be written is equal to a storage capacity of all the data blocks of one said stripe.

3. The method of increasing operational life time of SSD RAID of claim 1, wherein a first empty sub-area of the plurality of second empty areas of the empty stripe that is corresponding to the first data sub-area has a third storage capacity, a plurality of second empty sub-areas of the plurality of second empty areas of the empty stripe that are corresponding to the plurality of second data sub-areas each have a fourth storage capacity, the fourth storage capacity is greater than the third storage capacity, the first empty area has the third storage capacity, the first storage capacity plus the third storage capacity is equal to a total storage capacity of two said blocks, the second storage capacity plus the fourth storage capacity is equal to the total storage capacity of two said blocks, and a total storage capacity of the reserved sub-area and the third empty area is equal to the total storage capacity of two said blocks.

4. The method of increasing operational life time of SSD RAID of claim 1, wherein each of the index combinations includes a flag, an address, and a disk index to generate one said composite stripe in one said storage area, wherein the flag is used to indicate whether to generate one said composite stripe, the address is used to point to one said stripe of the plurality of the stripes in one said storage area, and the disk index is used to select one said solid-state disk of the plurality of solid-state disks for setting the reserved sub-area and the third empty area.

5. The method of increasing operational life time of SSD RAID of claim 4, wherein a plurality of the index combinations of the mapping table form a fixed configuration or a time-varying configuration.

6. The method of increasing operational life time of SSD RAID of claim 5, wherein when the plurality of the index combinations of the mapping table form said fixed configuration, each said solid-state disk has a sum of the reserved spaces each disposed in one of the plurality of storage areas that accounts for a fixed proportion of a total storage space thereof.

7. The method of increasing operational life time of SSD RAID of claim 1, further including:
   executing a RAID emergency checking procedure to check whether a predetermined number of the solid-state disks have failed to work normally.

8. The method of increasing operational life time of SSD RAID of claim 7, wherein, when the RAID emergency checking procedure has an execution result of false, the data storage device will find two target disks of the solid-state disks that have closest remaining write times among any two of the solid-state disks and select one of the two target disks for setting the reserved sub-area and the third empty area, and when the RAID emergency checking procedure has an execution result of true, the data storage device will find a target disk of the solid state disks that has the least number of remaining write times among the solid state hard disks and set the reserved sub-area and the third empty area on the target disk.

* * * * *